UNITED STATES PATENT OFFICE.

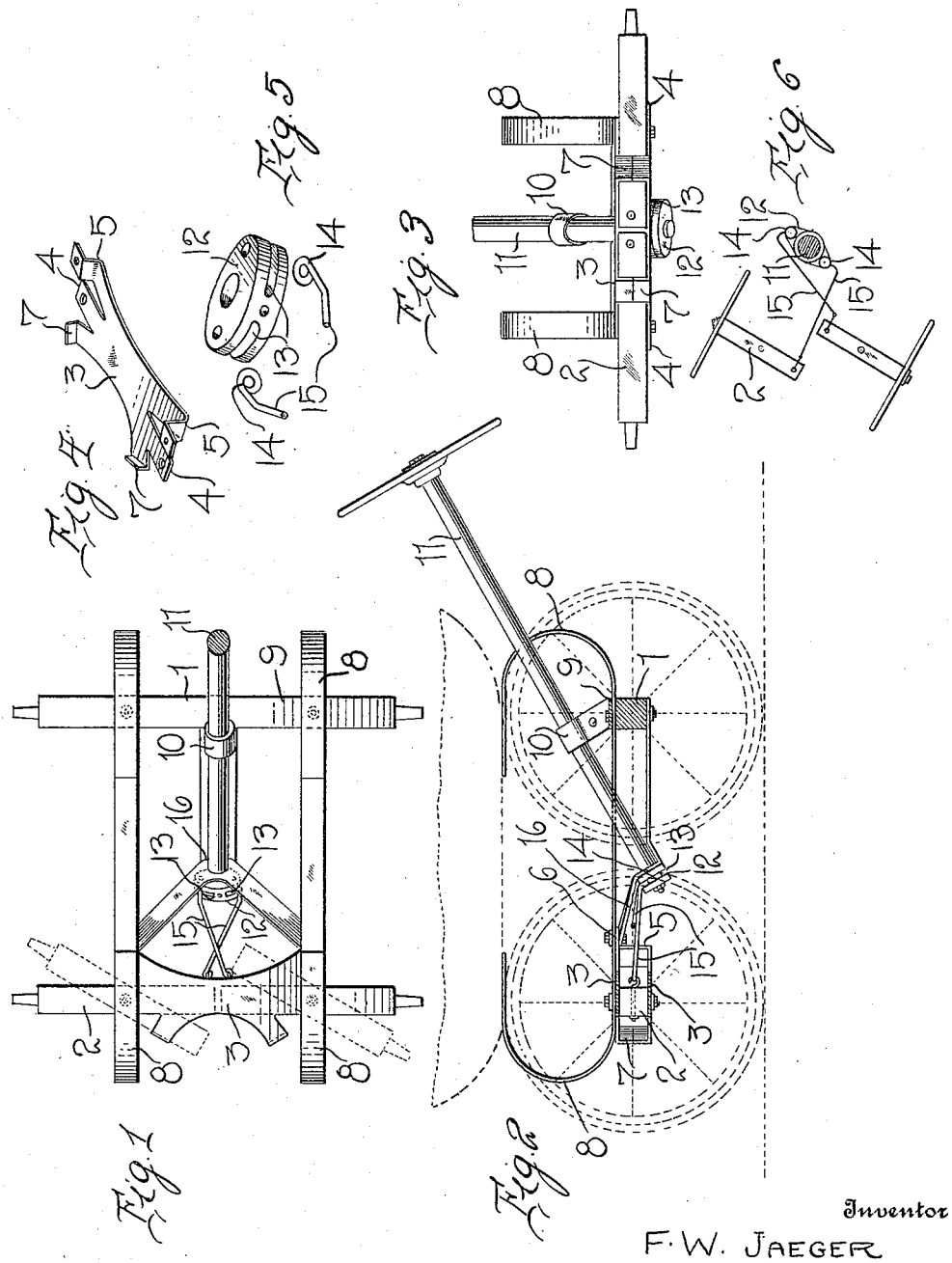

FRED W. JAEGER, OF WATERTOWN, SOUTH DAKOTA.

CHILD'S CARRIAGE.

1,147,946. Specification of Letters Patent. Patented July 27, 1915.

Application filed December 31, 1914. Serial No. 879,874.

*To all whom it may concern:*

Be it known that I, FRED W. JAEGER, a citizen of the United States, residing at Watertown, in the county of Codington and State of South Dakota, have invented certain new and useful Improvements in Children's Carriages, of which the following is a specification, reference being had to the accompanying drawings.

This invention relates to new and useful improvements in carriages and more particularly to children's carriages, the main object of the present invention being the provision of a carriage of this type which, in construction, resembles an automobile and has connected therewith steering mechanism which is practically the same as that used upon large motor vehicles so that the person pushing the carriage can readily pass through a crowded street and quickly and easily pass pedestrians with very little trouble.

Another object of the present invention is the provision of a carriage of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a top plan view of the frame of a carriage, the steering post being shown in cross section. Fig. 2 is a longitudinal sectional view. Fig. 3 is a detail front elevation. Fig. 4 is a detail perspective view of one of the bearing plates. Fig. 5 is a detail perspective view of the head applied to the steering post; and Fig. 6 is a diagrammatic plan view illustrating one of the positions the forward wheels assume upon the rotation of the steering post.

Referring more particularly to the drawing, 1 indicates the rear axle of my improved carriage and 2 the front axle which is formed in sections arranged between the bearing plates 3, each of said plates being provided with tongues 4 adapted to be disposed upon opposite sides of each section of the axle 2 and pivotally secured thereto, whereby the axle sections will be mounted for pivotal movement. The plates are further provided with bracing tongues 5 which extend radially of the carriage and are connected together, as shown at 6. The forward edges of each of the plates 3 are provided with obliquely disposed tongues 7, the outer ends of which are bent inwardly at right angles to form stops whereby to limit the swinging movement of the pivoted sections of the axles 2.

Mounted upon the axles 1 and 2, are the spring members 8, the ends of which are arranged in spaced relation with the bodies of said springs whereby to form a yieldable support for the body of the carriage. Extending transversely across the spring members at the rear ends thereof, is a bar 9, the intermediate portion of which is bent upon itself to form a sleeve 10 and mounted for rotation within this sleeve, is a steering post 11. Mounted upon the lower end of the steering post 11, is an elongated head 12, the ends of which are provided with grooves 13 to form spaced perforated ears. Arranged between the ears at each end of the head 12, are loops 14 formed upon the inner ends of the rods 15, said rods being arranged in crossed relation adjacent their forward ends and loosely connected with the inner ends of the forward axle sections, whereby the rotation of the head 12 will actuate the axle sections simultaneously for guiding the carriage.

The steering post 11 is securely retained in position by means of a Y-shaped brace 16, the brace being secured at its outer end to the rear axle 1, while the ends of the body of the brace are secured to the tongues 5 of the plates 3, so that the intermediate portion of the brace will be disposed centrally of the carriage and provided with an opening whereby to receive the lower end of the steering post 11 and form a bearing in which the steering post is rotated.

From the foregoing it will be readily apparent that the steering post 11 not only constitutes means for guiding the carriage, but also constitutes the means whereby the carriage is pushed along. It will also be noted that I have provided a simple and durable children's carriage which can be easily pushed about and readily guided through a crowd and, at the same time, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I desire to claim and secure by Letters Patent, is:—

1. The combination with a baby carriage, of a sectional axle upon which the front wheels are mounted, bearing plates arranged upon the upper and lower faces of said sections, bolts extending through the plates and through the central portions of the sections whereby to mount said sections for pivotal movement, means carried by the bearing plate for limiting the pivotal movement of said sections, and means connected with said sections for steering the carriage.

2. The combination with a baby carriage, of a sectional axle upon which the front wheels are mounted, bearing plates arranged upon the upper and lower faces of said sections, means for mounting the sections for pivotal movement between the plates, oppositely disposed lugs carried by said plates forming stops to limit the pivotal movement of each of the sections in one direction, bracing lugs formed upon each section and adapted to be connected together, and means connected with the axle sections for steering the carriage, said means constituting the means whereby the carriage is pushed.

3. The combination with a baby carriage, of a sectional axle upon which the front wheels are mounted, a rear axle, a plate mounted upon the rear axle having its intermediate portion bent upon itself to form a sleeve, a steering post mounted for rotation within the sleeve, a head upon the lower end of the steering post, rods each having one of their ends loosely connected with the head, the other ends of said rods being crossed and loosely and directly connected to the sections of the front axle, whereby said steering post is used for guiding and pushing the carriage.

4. The combination with a baby carriage, of a sectional axle upon which the front wheels are mounted, a rear axle, a sleeve supported by the rear axle, a steering post mounted for rotation therein, a head upon the lower end of the steering post, rods, each having one of their ends loosely connected with the head and their other ends crossed and loosely connected with the front axle sections, a Y member provided at its central portion, with an opening to receive the steering post to support the same, said steering post being adapted to be used for guiding and pushing the carriage.

5. The combination with a carriage, of an axle consisting of two independent, pivotally mounted sections, bearing plates receiving the sections, a pair of spaced lugs extending forwardly from the bearing plates, and a steering post operatively connected to the axle sections, each of said lugs being adapted to engage with one of said axles for limiting the swinging movement of both of said axles upon the rotation of the steering post.

In testimony whereof I hereunto affix my signature in the presence of two witnesses.

FRED W. JAEGER.

Witnesses:
 ED. T. ELKINS,
 MARTIN BELATTI.

Copies of this patent may be obtained for five cents each, by addressing the "Commissioner of Patents, Washington, D. C."